(12) United States Patent
Bai

(10) Patent No.: US 7,949,450 B2
(45) Date of Patent: May 24, 2011

(54) CONTROL SYSTEM FOR A TORQUE TRANSMITTING DEVICE IN AN AUTOMATIC TRANSMISSION

(75) Inventor: Shushan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 808 days.

(21) Appl. No.: 11/937,731

(22) Filed: Nov. 9, 2007

(65) Prior Publication Data

US 2009/0125200 A1    May 14, 2009

(51) Int. Cl.
*G06F 19/00* (2006.01)
(52) U.S. Cl. ............. 701/51; 701/60; 477/127; 477/156
(58) Field of Classification Search .................... 701/51, 701/60; 477/127, 156, 158, 162; 475/117, 475/131

See application file for complete search history.

(56) References Cited

U.S. PATENT DOCUMENTS

| | | | |
|---|---|---|---|
| 5,492,509 A * | 2/1996 | Goates | 475/131 |
| 6,155,949 A * | 12/2000 | Long et al. | 475/127 |
| 6,637,282 B2 * | 10/2003 | Harries | 74/335 |
| 7,373,234 B1 * | 5/2008 | Hwang et al. | 701/60 |
| 7,389,795 B2 * | 6/2008 | Potter et al. | 137/625.64 |
| 2008/0066463 A1 * | 3/2008 | Davison et al. | 60/459 |
| 2008/0216908 A1 * | 9/2008 | Vernacchia et al. | 137/628 |
| 2008/0220939 A1 * | 9/2008 | Vernacchia et al. | 477/127 |
| 2009/0036265 A1 * | 2/2009 | Hwang et al. | 477/76 |

* cited by examiner

Primary Examiner — Thomas G Black
Assistant Examiner — Marthe Marc Coleman

(57) ABSTRACT

A control system for controlling a torque transmitting device in a transmission includes a controller, a plurality of solenoids, and a valve assembly. The valve assembly has a plurality of signal control areas in communication with the solenoids that are used to control the torque transmitting device to provide multiple gains of torque transmission.

17 Claims, 2 Drawing Sheets

CONTROL SYSTEM FOR A TORQUE TRANSMITTING DEVICE IN AN AUTOMATIC TRANSMISSION

FIELD

The invention relates generally to a control system, and more particularly to a control system for controlling a torque transmitting device in an automatic transmission.

BACKGROUND

The statements in this section merely provide background information related to the present disclosure and may or may not constitute prior art.

A typical multi-speed automatic transmission uses a combination of torque transmitting devices, such as clutches, dog clutches/synchronizers, or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

In order to engage the torque transmitting devices, a typical automatic transmission includes a hydraulic clutch control system that employs a hydraulic fluid to selectively actuate the torque transmitting devices. However, the conventional hydraulic clutch control system only provides single control gain and therefore the control resolution is limited (i.e. the conventional hydraulic clutch control system can only fully engage or disengage the torque transmitting device). However, in modern automatic transmissions it is desirable to have a hydraulic control system which can provide multiple control gains to control the torque capacity of torque transmitting devices. Accordingly, there is room in the art for a control system operable to provide multiple control gains using regulated pressurized hydraulic fluid to a torque transmitting device.

SUMMARY

The present invention provides a control system for controlling a torque transmitting device in a transmission. The system includes a controller, a plurality of solenoids, and a valve assembly. The valve assembly has a plurality of signal control areas in communication with the solenoids that are used to control the torque transmitting device to provide multiple gains of torque transmission.

An embodiment of the control system of the present invention includes a controller for providing a first control signal and a second control signal, a first solenoid in communication with the controller and having a first port for receiving a first fluid flow and a second port in communication with the first port for selectively receiving the first fluid flow, a second solenoid in communication with the controller and having a first port for receiving a second fluid flow and a second port in communication with the first port for selectively receiving the second fluid flow, and a valve assembly having a valve movably disposed within a valve body, the valve body having a first inlet port in communication with the second port of the first solenoid, a second inlet port in communication with second port of the second solenoid, a third inlet port for receiving a third fluid flow, an outlet port in communication with the third inlet port for selectively receiving the third fluid flow, and the valve having a first signal area in communication with the first inlet port and a second signal area in communication with the second inlet port. The first control signal activates the first solenoid to open such that the second port of the first solenoid receives the first fluid flow and communicates the first fluid flow to the first inlet port of the valve assembly wherein the first fluid flow engages the first signal area and moves the valve to a first position to allow the third fluid flow to communicate with the outlet port at a first pressure, the second control signal activates the second solenoid to open such that the second port of the second solenoid receives the second fluid flow and communicates the second fluid flow to the second inlet port of the valve assembly wherein the second fluid flow engages the second signal area and moves the valve to a second position to allow the third fluid flow to communicate with the outlet port at a second pressure, and both the first control signal and the second control signal activate the first and second solenoids to open such that the first fluid flow engages the first signal area and the second fluid flow engages the second signal area to move the valve to a third position to allow the third fluid flow to communicate with the outlet port at a third pressure. The first pressure of the third fluid flow initiates the first mode of transmission operation, the second pressure of the third fluid flow initiates the second mode of transmission operation, and the third pressure of the third fluid flow initiates the third mode of transmission operation.

In one aspect of the present invention, the first control area is hydraulically isolated from the second control area.

In another aspect of the present invention, a biasing member is located within the valve body for biasing the valve into a fourth position.

In yet another aspect of the present invention, the fourth position of the valve prevents the outlet port from receiving the third fluid flow.

In yet another aspect of the present invention, the first fluid flow acts on the first control area in a direction opposite that of a direction the biasing member biases the valve.

In yet another aspect of the present invention, the second fluid flow acts on the second control area in a direction opposite that of the direction the biasing member biases the valve.

In yet another aspect of the present invention, an actuating device is in communication with the outlet port and is moveable to initiate the first mode of transmission operation when receiving the third fluid flow at the first pressure, is moveable to initiate the second mode of transmission operation when receiving the third fluid flow at the second pressure, and is moveable to initiate the third mode of transmission operation when receiving the third fluid flow at the third pressure.

In yet another aspect of the present invention, the actuating device includes a piston coupled to a clutch pack in a torque transmitting device.

In yet another aspect of the present invention, the first mode of transmission operation corresponds to a first amount of torque transmission through the torque transmitting device, the second mode of transmission operation corresponds to a second amount of torque transmission through the torque transmitting device, and the third mode of transmission operation corresponds to a third amount of torque transmission through the torque transmitting device.

In yet another aspect of the present invention, a feedback channel is in communication with the outlet port and is in communication with the end of the valve engaged by the biasing member, wherein the third fluid flow communicates through the feedback channel and engages the valve in the direction that the biasing member biases the valve.

Another embodiment of the control system of the present invention includes a controller for providing a first control signal and a second control signal, a first solenoid in communication with the controller and having a first port for receiving a first fluid flow and a second port in communication with the first port for selectively receiving the first fluid flow, a second solenoid in communication with the controller and having a first port for receiving a second fluid flow and a second port in communication with the first port for selectively receiving the second fluid flow, a valve assembly having a valve movably disposed within a valve body, the valve body having a first inlet port in communication with the second port of the first solenoid, a second inlet port in communication with second port of the second solenoid, a third inlet port for receiving a third fluid flow, an outlet port in communication with the third inlet port for selectively receiving the third fluid flow, and the valve having a first signal area in communication with the first inlet port and a second signal area in communication with the second inlet port, and a torque transmitting device in communication with the outlet port and operable to provide a first amount of torque transmission, a second amount of torque transmission, and a third amount of torque transmission. The first control signal activates the first solenoid to open such that the second port of the first solenoid receives the first fluid flow and communicates the first fluid flow to the first inlet port of the valve assembly wherein the first fluid flow engages the first signal area and moves the valve to a first position to allow the third fluid flow to communicate with the outlet port at a first pressure, the second control signal activates the second solenoid to open such that the second port of the second solenoid receives the second fluid flow and communicates the second fluid flow to the second inlet port of the valve assembly wherein the second fluid flow engages the second signal area and moves the valve to a second position to allow the third fluid flow to communicate with the outlet port at a second pressure, and both the first control signal and the second control signal activate the first and second solenoids to open such that the first fluid flow engages the first signal area and the second fluid flow engages the second signal area to move the valve to a third position to allow the third fluid flow to communicate with the outlet port at a third pressure. The third fluid flow at the first pressure initiates the first amount of torque transmission, the third fluid flow at the second pressure initiates the second amount of torque transmission, and the third fluid flow at the third pressure initiates the third amount of torque transmission.

In one aspect of the present invention, the first control area is hydraulically isolated from the second control area.

In another aspect of the present invention, a biasing member is located within the valve body for biasing the valve into a fourth position.

In yet another aspect of the present invention, the fourth position of the valve prevents the outlet port from receiving the third fluid flow.

In yet another aspect of the present invention, the first fluid flow acts on the first control area in a direction opposite that of a direction the biasing member biases the valve.

In yet another aspect of the present invention, the second fluid flow acts on the second control area in a direction opposite that of the direction the biasing member biases the valve.

In yet another aspect of the present invention, a feedback channel is in communication with the outlet port and is in communication with the end of the valve engaged by the biasing member, wherein the third fluid flow communicates through the feedback channel and engages the valve in the direction that the biasing member biases the valve.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
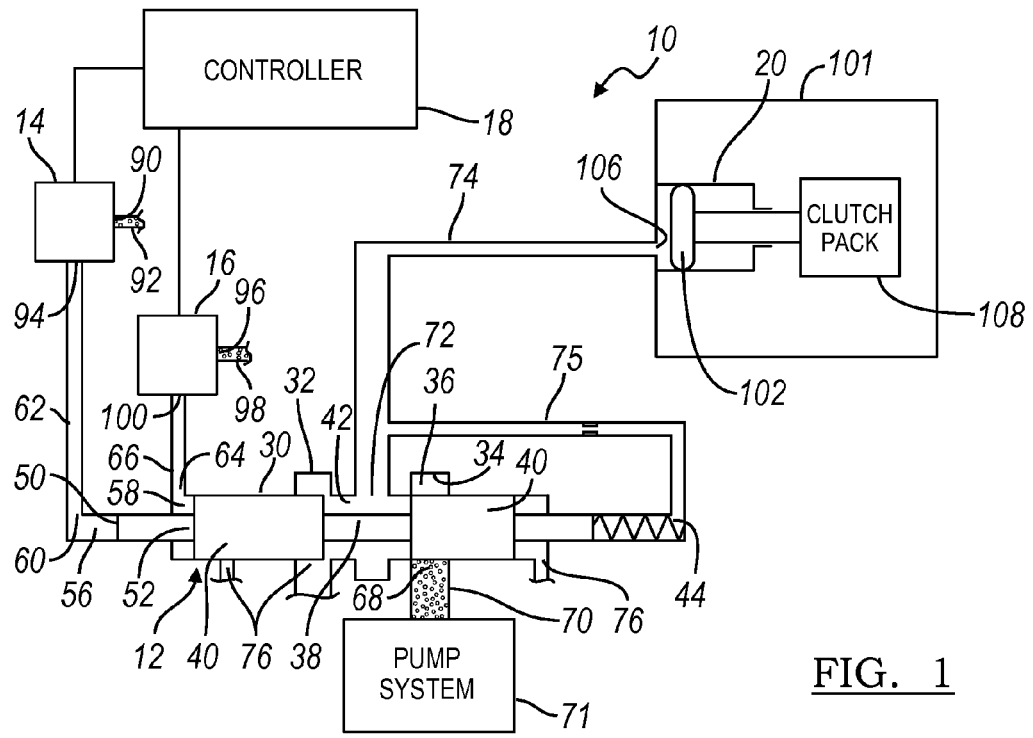
FIG. 1 is a diagrammatic view of an embodiment of a control system for an automatic transmission according to the principles of the present invention in a first condition.

With reference to FIG. 1, a control system for use in an automatic transmission in a motor vehicle is illustrated schematically and generally indicated by reference number 10. The control system 10 generally includes a valve assembly 12, a first solenoid 14, a second solenoid 16, a controller 18, and an actuating device 20. The control system 10 is operable to control a torque transmitting mechanism in the transmission, as will be described in greater detail below.

Figure 2:
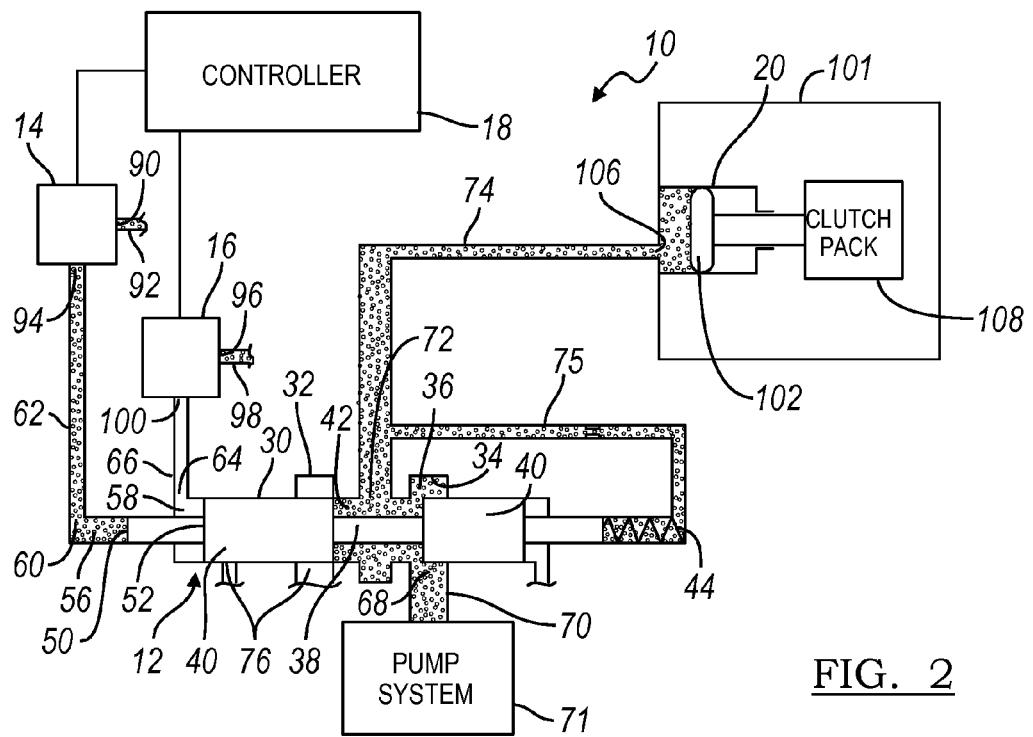
FIG. 2 is a diagrammatic view of an embodiment of a control system for an automatic transmission according to the present invention in a second condition.
Figure 3:
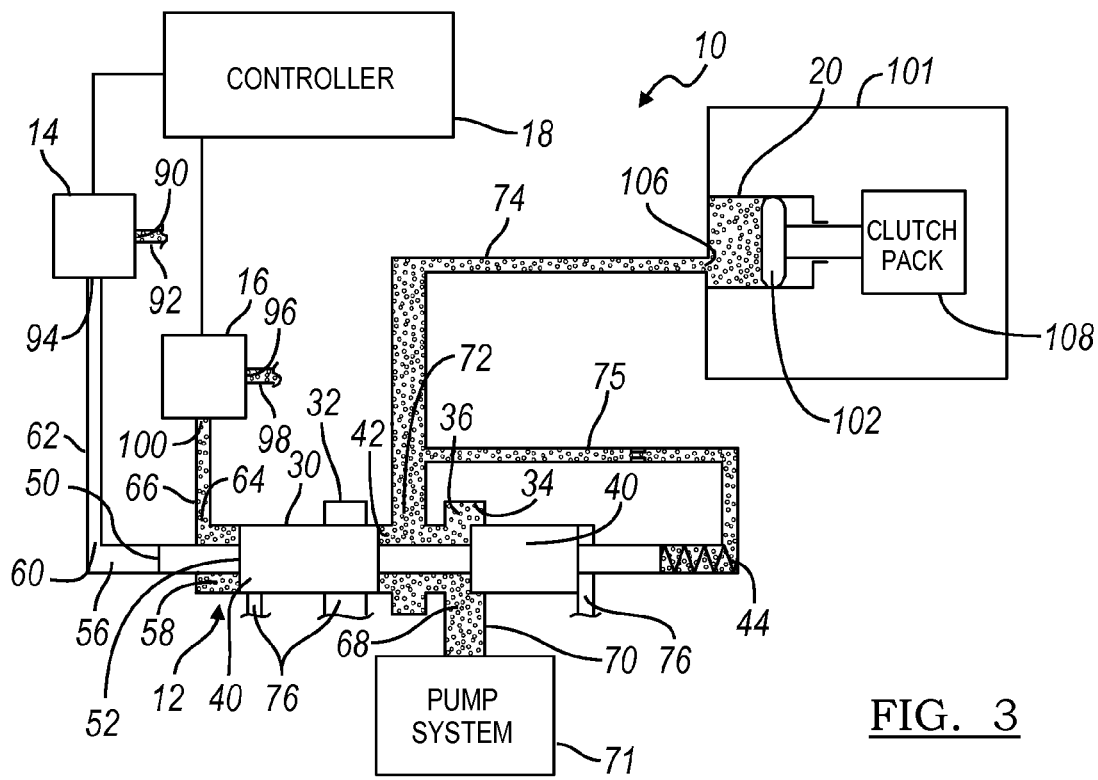
FIG. 3 is a diagrammatic view of an embodiment of a control system for an automatic transmission according to the present invention in a third condition.
Figure 4:
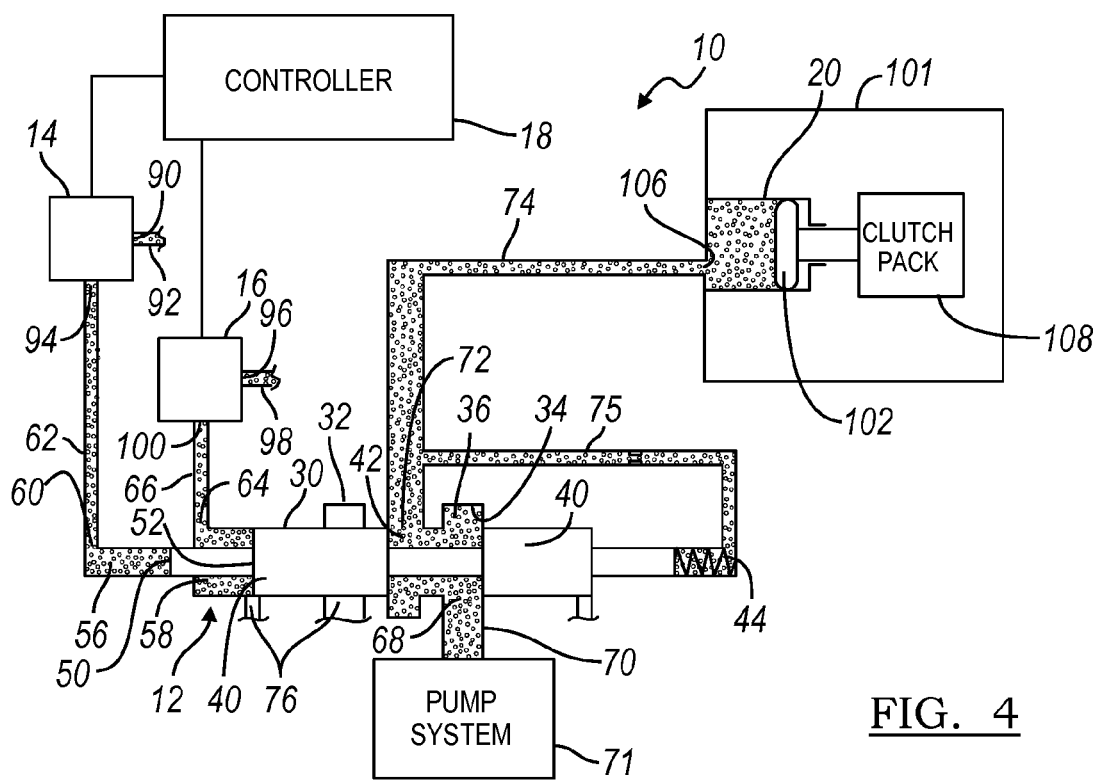
FIG. 4 is a diagrammatic view of an embodiment of a control system for an automatic transmission according to the present invention in a fourth condition.

The valve assembly 12 includes a valve 30 located within a valve body 32. More specifically, the valve body 32 includes a wall 34 that defines a valve chamber 36 and the valve 30 is slidably supported within the valve chamber 36. The valve body 32 is preferably formed as an integral component of the transmission. The valve 30 includes a central body 38 that extends along a length of the valve chamber 36. A plurality of lands 40, two in the example provided, extend from the central body 38 and engage or seal against the wall 34 of the valve chamber 36. The lands 40 are spaced along the length of the central body 38 and cooperate with the wall 34 of the valve chamber 36 to define a fluid chamber 42. The valve 30 is moveable within the valve chamber 36 between a plurality of positions including a first position as illustrated in FIG. 1, a second position as illustrated in FIG. 2, a third position as illustrated in FIG. 3, and a fourth position as illustrated in FIG. 4. A biasing member 44, such as a spring, is located within the valve chamber 36 between the valve 30 and the wall 34. The biasing member 44 biases the valve 30 to the first position.

The valve 30 further includes control areas including a first control area 50 and a second control area 52. In the example provided, the first control area 50 is a planar, terminal end surface of the valve 60, though it should be appreciated that the first control area 50 may take various sizes and surface shapes without departing from the scope of the present invention. The first control area 50 cooperates with the wall 34 to define a first signal fluid chamber 56. In the example provided, the second control area 52 is a planar end surface of one of the lands 40, though it should be appreciated that the second control area 52 may also take various sizes and surface shapes without departing from the scope of the present invention. The second control area 52 cooperates with the wall 34 to define a second signal fluid chamber 58 that is separate and hydraulically sealed from the first signal fluid chamber 56.

The valve body 32 further defines a plurality of ports or openings that connect with a plurality of fluid communication channels or passages. In the example provided, the valve body 32 includes a first inlet port 60 that communicates with the first signal fluid chamber 56 at an end of the valve 30 opposite the end of the valve 30 engaged by the biasing member 44. The first inlet port 60 communicates with a first fluid communication channel 62. A second inlet port 64 communicates with the second signal fluid chamber 58 between the first signal fluid chamber 56 and the end of the valve 30 engaged by the biasing member 44. The second inlet port 64 communicates with a second fluid communication channel 66. A third inlet port 68 selectively communicates with the fluid chamber 42 between the second signal fluid chamber 58 and the end of the valve 30 engaged by the biasing member 44. The third inlet port 68 communicates with a third fluid communication channel 70. The third fluid communication channel 70 is in fluid communication with a pump system 71 that provides a pressurized hydraulic fluid flow. An outlet port 72 communicates with the fluid chamber 42 between the second and third inlet ports 64, 68. The outlet port 72 communicates with a fourth fluid communication channel 74 and a pressure feedback channel 75. The pressure feedback channel 75 communicates with an end of the valve 30 engaged by the biasing member 44. Finally, the valve body 32 includes a plurality of exhaust ports 76 that communicate with the valve chamber 36 at various locations along the length of the valve chamber 36. It should be appreciated that various other arrangements of fluid communication channels and ports may be employed without departing from the scope of the present invention.

The first solenoid 14 is employed to initiate the first and third position of the valve 30, as will be described in further detail below. The first solenoid 14 generally includes a first fluid port 90 in fluid communication with a first pressure regulated line channel 92 and includes a second fluid port 94 in fluid communication with the first fluid communication channel 62. The first pressure regulated line channel 92 delivers a first fluid flow of pressurized hydraulic fluid from a fluid source (not shown) to the first solenoid 14. The first solenoid 14 is operable to selectively open to allow a first fluid flow from the first pressure regulated line channel 92 to pass from the first fluid port 90 through the first solenoid 14 to the second fluid port 94 and to enter the first fluid communication channel 62. The output pressure of the first solenoid 14 is proportional to an electric current supplied to a coil (not shown) located within the first solenoid 14. For example, when a current supplied to the first solenoid 14 changes from 0 to 1 ampere, the output pressure of the hydraulic fluid from the first solenoid 14 changes from about 0 to 80 psi. However, it should be appreciated that various other currents and pressures may be employed without departing from the scope of the present invention. Additionally, the first solenoid 14 may be an on/off solenoid that either fully opens or closes and that is normally low or closed when not energized by a power source, however, various other kinds of solenoids may be employed without departing from the scope of the present invention.

The second solenoid 16 is employed to initiate the second and third position of the valve 30, as will be described in further detail below. The second solenoid 16 generally includes a first fluid port 96 in fluid communication with a second pressure regulated line channel 98 and includes a second fluid port 100 in fluid communication with the second fluid communication channel 66. The second pressure regulated line channel 98 delivers a second fluid flow of pressurized hydraulic fluid from a fluid source (not shown) to the second solenoid 16. The second solenoid 16 is operable to selectively open to allow a second fluid flow from the second pressure regulated line channel 98 to pass from the first fluid port 98 through the second solenoid 16 to the second fluid port 100 and to enter the second fluid communication channel 66. The output pressure of the second solenoid 16 is proportional to an electric current supplied to a coil (not shown) located within the second solenoid 16. For example, when a current supplied to the second solenoid 16 changes from 0 to 1 ampere, the output pressure of the hydraulic fluid from the second solenoid 16 changes from about 0 to 80 psi. However, it should be appreciated that various other currents and pressures may be employed without departing from the scope of the present invention. Additionally, the second solenoid 16 may be an on/off solenoid that either fully opens or closes and that is normally low or closed when not energized by a power source, though various other kinds of solenoids may be employed without departing from the scope of the present invention.

The controller 18 is in electronic communication with the first solenoid 14 and the second solenoid 16. The controller 18 may be a transmission control module or an engine control module and is preferably an electronic device having a preprogrammed digital computer or processor, control logic, memory used to store data, and at least one I/O peripheral. The control logic includes a plurality of logic routines for monitoring, manipulating, and generating data. However, various other types of controllers may be employed without departing from the scope of the present invention. The controller 18 receives input signals indicative of a desired operating mode of the actuating device 20. The controller 18 then electronically communicates with the solenoids 14, 16, using a plurality of control signals to initiate the desired transmission operating mode. More specifically, the controller 18 controls the solenoids 14, 16 by controlling the electric current provided to the coil of the solenoids 14, 16.

The actuating device 20 is operable to translate hydraulic fluid pressure communicated through the valve assembly 30 into mechanical movement or translation of a component within a torque transmitting device 101. In the particular example provided, the torque transmitting device 101 is a friction clutch or brake having multiple gains, however, it should be appreciated that the torque transmitting device 101 may be a synchronizer or other device without departing from the scope of the present invention. Accordingly, the actuating device 20 in the example provided is a clutch piston 102 that is linearly moveable within a clutch housing 104. The clutch housing 104 includes an inlet port 106 in fluid communication with the fourth fluid communication channel 74. The piston 102 is preferably coupled to a clutch pack 108 that includes a plurality of interleaved friction discs (not shown). Movement of the clutch piston 102 towards the clutch pack 106 forces the interleaved discs to engage and transmit torque therebetween. Therefore, the degree of movement or engagement of the clutch piston 102 controls the amount of torque transmitted through the torque transmitting device 101.

As noted above, movement of the valve 30 between various positions controls the engagement of the actuating device 20. More specifically, when the controller 18 signals the first solenoid 14 and the second solenoid 16 to close, the actuating device 20 is disengaged. In this condition, the valve 30 is biased by the biasing member 44 into the first position, as shown in FIG. 1, and one of the lands 40 seals the third inlet port 68 from communicating with the fluid chamber 42.

Accordingly, any hydraulic fluid within the fluid chamber vents through one of the exhaust ports 76, and the piston 102 remains in a first position. When the piston 102 is in the first position the torque transmitting device 101 is disengaged and not transmitting torque therethrough.

Multiple gains of torque transmission through the torque transmitting device 101 is achieved by selectively activating or opening the first solenoid 14 and the second solenoid 16, singly and in combination. Generally speaking, when the first solenoid 14 is activated, the pressure at fluid port 72 and in the actuator 20 will change from 0 to X psi as the current supplied to the first solenoid 14 changes, for example, from 0 to 1 ampere. When the second solenoid 16 is activated, the pressure at fluid port 72 and in the actuator 20 will change from 0 to Y psi as the current supplied to the second solenoid 16 changes, for example, from 0 to 1 ampere. When both the first solenoid 14 and the second solenoid 16 are activated, the pressure at fluid port 72 and in the actuator 20 will change from 0 to X+Y psi as the current supplied to the first solenoid 14 and the second solenoid 16 changes, for example, from 0 to 1 ampere. The value of X and Y are determent by the size of the first and second signal areas 50 and 52 of the valve 30.

For example, a first gain of torque transmission may be achieved when the controller 18 signals the first solenoid 14 to open while the second solenoid 16 remains closed, as shown in FIG. 2. Accordingly, the first fluid flow passes through the first solenoid 14 and into the first fluid communication channel 62 and into the first signal fluid chamber 56. The first fluid flow acts against the first control area 50 of the valve 30 and moves the valve 30 into the second position. When in the second position, the land 40 of the valve 30 opens the third inlet port 68 a first amount such that the third fluid flow from the third fluid communication channel 70 enters the fluid chamber 42. The third fluid flow then communicates through the outlet port 72 into the fourth fluid communication channel 74 where the third fluid flow engages the piston 102 and moves the piston 102 to a second position. The second position of the piston 102 corresponds to the first gain of torque transmission through the torque transmitting device 101. The third fluid flow also enters the pressure feedback channel 75 and engages the valve 30. Accordingly, the second position of the valve 30 corresponds to a position where the pressure force of first fluid flow on the valve 30 is in equilibrium with the pressure forces of the third fluid flow and the biasing member 44 on the valve 30.

A second gain of torque transmission may be achieved when the controller 18 signals the second solenoid 16 to open while the first solenoid 14 remains closed, as shown in FIG. 3. Accordingly, the second fluid flow passes through the second solenoid 16 and into the second fluid communication channel 64 and into the second signal fluid chamber 58. The second fluid flow acts against the second control area 52 of the valve 30 and moves the valve 30 into the third position. When in the third position, the land 40 of the valve 30 opens the third inlet port 68 a second amount such that the third fluid flow from the third fluid communication channel 70 enters the fluid chamber 42. The third fluid flow then communicates through the outlet port 72 into the fourth fluid communication channel 74 where the third fluid flow engages the piston 102 and moves the piston 102 to a third position. The third position of the piston 102 corresponds to the second gain of torque transmission through the torque transmitting device 101. The third fluid flow also enters the pressure feedback channel 75 and engages the valve 30. Accordingly, the third position of the valve 30 corresponds to a position where the pressure force of second fluid flow on the valve 30 is in equilibrium with the pressure forces of the third fluid flow and the biasing member 44 on the valve 30.

A third gain of torque transmission may be achieved when the controller 18 signals both the first and second solenoids 14, 16 to open, as shown in FIG. 4. Accordingly, the first fluid flow passes through the first solenoid 14 and into the first fluid communication channel 62 and into the first signal fluid chamber 56 while the second fluid flow passes through the second solenoid 16 and into the second fluid communication channel 64 and into the second signal fluid chamber 58. The first fluid flow acts against the first control area 50 of the valve 30 and the second fluid flow acts against the second control area 52 of the valve 30. The combined pressure of the first and second fluid flows move the valve 30 into the fourth position. When in the fourth position, the land 40 of the valve 30 opens the third inlet port 68 a third amount such that the third fluid flow from the third fluid communication channel 70 enters the fluid chamber 42. The third fluid flow then communicates through the outlet port 72 into the fourth fluid communication channel 74 where the third fluid flow engages the piston 102 and moves the piston 102 to a fourth position. The fourth position of the piston 102 corresponds to the third gain or full torque transmission through the torque transmitting device 101. The third fluid flow also enters the pressure feedback channel 75 and engages the valve 30. Accordingly, the fourth position of the valve 30 corresponds to a position where the pressure forces of the first and second fluid flows on the valve 30 is in equilibrium with the pressure forces of the third fluid flow and the biasing member 44 on the valve 30.

The degree of torque transmission gain through the torque transmitting device 101 may be adjusted by controlling various factors such as the pressures of the various fluid flows, selection of the biasing member, and the surface areas of the control areas on the valve. Additional gains may be provided by adding solenoids and control areas to the control system 10.

The description of the invention is merely exemplary in nature and variations that do not depart from the gist of the invention are intended to be within the scope of the invention. Such variations are not to be regarded as a departure from the spirit and scope of the invention.

The invention claimed is:

1. A control system for a transmission, the transmission having a first mode of operation, a second mode of operation, and a third mode of operation, the control system comprising:
 a controller for providing a first control signal and a second control signal;
 a first solenoid in communication with the controller and having a first port for receiving a first fluid flow and a second port in communication with the first port for selectively receiving the first fluid flow;
 a second solenoid in communication with the controller and having a first port for receiving a second fluid flow and a second port in communication with the first port for selectively receiving the second fluid flow; and
 a valve assembly having a valve movably disposed within a valve body, the valve body having a first inlet port in communication with the second port of the first solenoid, a second inlet port in communication with second port of the second solenoid, a third inlet port for receiving a third fluid flow, an outlet port in communication with the third inlet port for selectively receiving the third fluid flow, and the valve having a first signal area in communication with the first inlet port and a second signal area in communication with the second inlet port;

wherein the first control signal activates the first solenoid to allow the second port of the first solenoid to receive the first fluid flow and communicate the first fluid flow to the first inlet port of the valve assembly wherein the first fluid flow contacts the first signal area and moves the valve to a first position to allow the third fluid flow to communicate with the outlet port at a first pressure, wherein the second control signal activates the second solenoid to allow the second port of the second solenoid to receive the second fluid flow and communicate the second fluid flow to the second inlet port of the valve assembly wherein the second fluid flow contacts the second signal area and moves the valve to a second position to allow the third fluid flow to communicate with the outlet port at a second pressure, and wherein both the first control signal and the second control signal activate the first and second solenoids to allow the first fluid flow to contact the first signal area and the second fluid flow to contact the second signal area to move the valve to a third position to allow the third fluid flow to communicate with the outlet port at a third pressure; and wherein the first pressure of the third fluid flow initiates the first mode of transmission operation, the second pressure of the third fluid flow initiates the second mode of transmission operation, and the third pressure of the third fluid flow initiates the third mode of transmission operation.

2. The control system of claim 1 wherein the first control signal area is hydraulically isolated from the second signal area.

3. The control system of claim 2 further comprising a biasing member located within the valve body for biasing the valve into a fourth position.

4. The control system of claim 3 wherein the fourth position of the valve prevents the outlet port from receiving the third fluid flow.

5. The control system of claim 1 wherein the first fluid flow acts on the first signal area in a direction opposite that of a direction a biasing member biases the valve.

6. The control system of claim 5 wherein the second fluid flow acts on the second signal area in a direction opposite that of the direction the biasing member biases the valve.

7. The control system of claim 6 further comprising an actuating device in communication with the outlet port, the actuating device moveable to initiate the first mode of transmission operation when receiving the third fluid flow at the first pressure, moveable to initiate the second mode of transmission operation when receiving the third fluid flow at the second pressure, and moveable to initiate the third mode of transmission operation when receiving the third fluid flow at the third pressure.

8. The control system of claim 7 wherein the actuating device includes a piston coupled to a clutch pack in a torque transmitting device.

9. The control system of claim 8 wherein the first mode of transmission operation corresponds to a first amount of torque transmission through the torque transmitting device, the second mode of transmission operation corresponds to a second amount of torque transmission through the torque transmitting device, and the third mode of transmission operation corresponds to a third amount of torque transmission through the torque transmitting device.

10. The control system of claim 9 further comprising a feedback channel in communication with the outlet port and in communication with the end of the valve engaged by the biasing member, wherein the third fluid flow communicates through the feedback channel and contacts the valve to urge the valve in the direction that the biasing member biases the valve.

11. A control system for a transmission comprising:
a controller for providing a first control signal and a second control signal;
a first solenoid in communication with the controller and having a first port for receiving a first fluid flow and a second port in communication with the first port for selectively receiving the first fluid flow;
a second solenoid in communication with the controller and having a first port for receiving a second fluid flow and a second port in communication with the first port for selectively receiving the second fluid flow;
a valve assembly having a valve movably disposed within a valve body, the valve body having a first inlet port in communication with the second port of the first solenoid, a second inlet port in communication with second port of the second solenoid, a third inlet port for receiving a third fluid flow, an outlet port in communication with the third inlet port for selectively receiving the third fluid flow, and the valve having a first signal area in communication with the first inlet port and a second signal area in communication with the second inlet port; and
a torque transmitting device in communication with the outlet port and operable to provide a first amount of torque transmission, a second amount of torque transmission, and a third amount of torque transmission;
wherein the first control signal activates the first solenoid to allow the second port of the first solenoid to receive the first fluid flow and communicate the first fluid flow to the first inlet port of the valve assembly wherein the first fluid flow contacts the first signal area and moves the valve to a first position to allow the third fluid flow to communicate with the outlet port at a first pressure, wherein the second control signal activates the second solenoid to allow the second port of the second solenoid to receive the second fluid flow and communicate the second fluid flow to the second inlet port of the valve assembly wherein the second fluid flow contacts the second signal area and moves the valve to a second position to allow the third fluid flow to communicate with the outlet port at a second pressure, and wherein both the first control signal and the second control signal activate the first and second solenoids to allow the first fluid flow to contact the first signal area and the second fluid flow to contact the second signal area to move the valve to a third position to allow the third fluid flow to communicate with the outlet port at a third pressure; and
wherein the third fluid flow at the first pressure initiates the first amount of torque transmission, the third fluid flow at the second pressure initiates the second amount of torque transmission, and the third fluid flow at the third pressure initiates the third amount of torque transmission.

12. The control system of claim 11 wherein the first signal area is hydraulically isolated from the second signal area.

13. The control system of claim 12 further comprising a biasing member located within the valve body for biasing the valve into a fourth position.

14. The control system of claim 13 wherein the fourth position of the valve prevents the outlet port from receiving the third fluid flow.

15. The control system of claim 14 wherein the first fluid flow acts on the first signal area in a direction opposite that of a direction the biasing member biases the valve.

16. The control system of claim 15 wherein the second fluid flow acts on the second signal area in a direction opposite that of the direction the biasing member biases the valve.

17. The control system of claim 16 further comprising a feedback channel in communication with the outlet port and in communication with the end of the valve engaged by the biasing member, wherein the third fluid flow communicates through the feedback channel and urges the valve in the direction that the biasing member biases the valve.

* * * * *